(12) United States Patent
McGeorge et al.

(10) Patent No.: US 10,853,482 B2
(45) Date of Patent: Dec. 1, 2020

(54) SECURE APPROACH FOR PROVIDING COMBINED ENVIRONMENT FOR OWNERS/OPERATORS AND MULTIPLE THIRD PARTIES TO COOPERATIVELY ENGINEER, OPERATE, AND MAINTAIN AN INDUSTRIAL PROCESS CONTROL AND AUTOMATION SYSTEM

(71) Applicant: Honeywell International Inc., Morris Plains, NJ (US)

(72) Inventors: Stephen R. McGeorge, Turramurra (AU); Peter Carl Davis, Gordon (AU); David Barry Granatelli, Lilyfield (AU); Graeme Laycock, Hunters Hill (AU); Rhett Newman, Newtown (AU); Paul Vellacott, Bridgeman Downs (AU)

(73) Assignee: Honeywell International Inc., Morris Plains, NJ (US)

( * ) Notice: Subject to any disclaimer, the term of this patent is extended or adjusted under 35 U.S.C. 154(b) by 185 days.

(21) Appl. No.: 15/469,866

(22) Filed: Mar. 27, 2017

(65) Prior Publication Data
US 2017/0351856 A1 Dec. 7, 2017

Related U.S. Application Data

(60) Provisional application No. 62/345,661, filed on Jun. 3, 2016.

(51) Int. Cl.
*G06F 21/53* (2013.01)
*H04L 29/08* (2006.01)
(Continued)

(52) U.S. Cl.
CPC ............ *G06F 21/53* (2013.01); *G05B 13/02* (2013.01); *G05B 19/418* (2013.01);
(Continued)

(58) Field of Classification Search
None
See application file for complete search history.

(56) References Cited

U.S. PATENT DOCUMENTS

| 5,657,390 A | 8/1997 | Elgamal et al. |
| 5,920,856 A | 7/1999 | Syeda-Mahmood |

(Continued)

FOREIGN PATENT DOCUMENTS

| DE | 102004030781 A1 | 3/2006 |
| EP | 2172887 A2 | 4/2010 |

(Continued)

OTHER PUBLICATIONS

International Search Report and Written Opinion of the International Searching Authority dated Aug. 22, 2017 in connection with International Patent Application No. PCT/US2017/033034, 11 pages.

(Continued)

*Primary Examiner* — Angela Nguyen

(57) ABSTRACT

A method includes creating, in a secure platform, multiple securely-partitioned system sandboxes under control of at least one user associated with an industrial process control and automation system. Different system sandboxes are associated with different third parties who are not owners or operators of the industrial process control and automation system. The method also includes receiving content from the third parties in the system sandboxes. The method further includes receiving from the at least one user a selective activation of at least some of the content in the system sandboxes in order to place the at least some of the content into use by the industrial process control and automation system. The content could include equipment configurations for equipment associated with the industrial process control (Continued)

and automation system, and the equipment configurations could include control strategies and visualizations for the equipment.

15 Claims, 4 Drawing Sheets

(51) Int. Cl.
    *G06F 21/62*     (2013.01)
    *G06F 11/32*     (2006.01)
    *G06F 11/30*     (2006.01)
    *G05B 13/02*     (2006.01)
    *G05B 19/418*     (2006.01)

(52) U.S. Cl.
    CPC ...... *G06F 11/3006* (2013.01); *G06F 11/3013* (2013.01); *G06F 11/324* (2013.01); *G06F 21/6218* (2013.01); *H04L 29/08072* (2013.01); *H04L 67/10* (2013.01); *H04L 67/125* (2013.01); *H04L 67/20* (2013.01); *H04L 67/34* (2013.01); *G06F 2221/2149* (2013.01)

(56) References Cited

U.S. PATENT DOCUMENTS

| | | |
|---|---|---|
| 6,029,165 A | 2/2000 | Gable |
| 6,108,686 A | 8/2000 | Williams, Jr. |
| 6,202,023 B1 | 3/2001 | Hancock |
| 6,480,896 B1 | 11/2002 | Brown et al. |
| 6,560,656 B1 | 5/2003 | O'Sullivan |
| 6,816,973 B1 | 11/2004 | Gleichauf et al. |
| 7,130,891 B2 | 10/2006 | Bernardin et al. |
| 7,151,966 B1 | 12/2006 | Baler et al. |
| 7,206,286 B2 | 4/2007 | Abraham et al. |
| 7,233,830 B1 | 6/2007 | Callaghan et al. |
| 7,266,417 B2 | 9/2007 | Liao |
| 7,286,897 B2 | 10/2007 | Liu et al. |
| 7,313,447 B2 | 12/2007 | Hsiung et al. |
| 7,343,152 B1 | 3/2008 | Khorram |
| 7,461,403 B1 | 12/2008 | Libenzi et al. |
| 7,548,977 B2 | 6/2009 | Agapi et al. |
| 7,584,274 B2 | 9/2009 | Bond et al. |
| 7,620,986 B1 | 11/2009 | Jagannathan et al. |
| 7,636,764 B1 | 12/2009 | Fein et al. |
| 7,684,876 B2 | 3/2010 | Grgic |
| 7,693,581 B2 | 4/2010 | Callaghan et al. |
| 7,799,273 B2 | 9/2010 | Popp |
| 7,870,106 B1 | 1/2011 | Nguyen et al. |
| 7,873,719 B2 | 1/2011 | Bishop et al. |
| 7,886,065 B1 | 2/2011 | Satish et al. |
| 7,957,335 B2 | 6/2011 | Durazzo et al. |
| 7,970,830 B2 | 6/2011 | Staggs et al. |
| 8,204,717 B2 | 6/2012 | McLaughlin et al. |
| 8,224,934 B1 * | 7/2012 | Dongre ................. H04L 63/102 709/221 |
| 8,555,381 B2 | 10/2013 | McLaughlin et al. |
| 9,218,000 B2 | 12/2015 | McLaughlin et al. |
| 9,271,142 B1 * | 2/2016 | Broch ................. H04L 41/0813 |
| 9,412,137 B2 | 8/2016 | McLaughlin et al. |
| 9,438,628 B2 | 9/2016 | Haridas et al. |
| 2002/0078382 A1 | 6/2002 | Sheikh et al. |
| 2003/0014498 A1 | 1/2003 | Kreidler et al. |
| 2003/0061212 A1 | 3/2003 | Smith et al. |
| 2003/0061481 A1 | 3/2003 | Levine |
| 2003/0088650 A1 | 5/2003 | Fassold et al. |
| 2003/0120778 A1 | 6/2003 | Chaboud et al. |
| 2003/0182359 A1 | 9/2003 | Vorchik et al. |
| 2004/0002943 A1 | 1/2004 | Merrill et al. |
| 2004/0128539 A1 | 7/2004 | Shureih |
| 2004/0260769 A1 | 12/2004 | Yamamoto |
| 2005/0021594 A1 | 1/2005 | Bernardin et al. |
| 2005/0021705 A1 | 1/2005 | Jurisch |
| 2005/0076245 A1 | 4/2005 | Graham et al. |
| 2005/0195840 A1 | 9/2005 | Krapp et al. |
| 2005/0256735 A1 | 11/2005 | Bayne |
| 2005/0276228 A1 | 12/2005 | Yavatkar et al. |
| 2005/0278441 A1 | 12/2005 | Bond et al. |
| 2006/0004786 A1 | 1/2006 | Chen et al. |
| 2006/0059163 A1 | 3/2006 | Frattura et al. |
| 2006/0085393 A1 | 4/2006 | Modesitt |
| 2006/0155633 A1 | 7/2006 | Fellenstein et al. |
| 2006/0184626 A1 | 8/2006 | Agapi et al. |
| 2006/0230149 A1 | 10/2006 | Jackson |
| 2006/0282876 A1 | 12/2006 | Shelest |
| 2007/0055702 A1 | 3/2007 | Fridella et al. |
| 2007/0074288 A1 | 3/2007 | Chang et al. |
| 2007/0157286 A1 | 7/2007 | Singh et al. |
| 2008/0120414 A1 | 5/2008 | Kushalnagar et al. |
| 2008/0159289 A1 | 7/2008 | Narayanan et al. |
| 2008/0163370 A1 | 7/2008 | Maynard |
| 2008/0208361 A1 | 8/2008 | Grgic |
| 2008/0270523 A1 | 10/2008 | Parmar et al. |
| 2008/0295173 A1 | 11/2008 | Tsvetanov |
| 2009/0043803 A1 * | 2/2009 | Frishberg .......... G06F 17/30994 |
| 2009/0058088 A1 | 3/2009 | Pitchford et al. |
| 2009/0125370 A1 | 5/2009 | Blondeau et al. |
| 2009/0132070 A1 | 5/2009 | Ebrom et al. |
| 2009/0172035 A1 | 7/2009 | Lessing et al. |
| 2009/0177289 A1 | 7/2009 | Glanzer et al. |
| 2009/0178108 A1 | 7/2009 | Hudis et al. |
| 2009/0210071 A1 | 8/2009 | Agrusa et al. |
| 2009/0271012 A1 | 10/2009 | Kopka et al. |
| 2009/0300151 A1 | 12/2009 | Friedman et al. |
| 2009/0300210 A1 | 12/2009 | Ferris |
| 2009/0300635 A1 | 12/2009 | Ferris |
| 2010/0022231 A1 | 1/2010 | Heins et al. |
| 2010/0023151 A1 | 1/2010 | Shieh et al. |
| 2010/0042720 A1 | 2/2010 | Stienhans et al. |
| 2010/0161817 A1 | 6/2010 | Xiao |
| 2010/0256794 A1 | 10/2010 | McLaughlin et al. |
| 2010/0256795 A1 | 10/2010 | McLaughlin et al. |
| 2010/0257605 A1 | 10/2010 | McLaughlin et al. |
| 2011/0214157 A1 | 9/2011 | Korsunsky et al. |
| 2011/0231450 A1 | 9/2011 | Sinha |
| 2012/0174182 A1 | 7/2012 | Neely |
| 2012/0209411 A1 * | 8/2012 | Ohkado ................. G06F 21/552 700/80 |
| 2013/0111211 A1 | 5/2013 | Winslow et al. |
| 2014/0007253 A1 | 1/2014 | Hardt |
| 2014/0007254 A1 | 1/2014 | Bukurak et al. |
| 2014/0173355 A1 | 6/2014 | Aasheim et al. |
| 2016/0011952 A1 * | 1/2016 | Tejerina ................. G06F 11/30 714/41 |

FOREIGN PATENT DOCUMENTS

| | | |
|---|---|---|
| WO | 2005020179 A1 | 3/2005 |
| WO | 2009046095 A1 | 4/2009 |

OTHER PUBLICATIONS

Croft et al., RFC 951, Internet Engineering Task Force, 1985, pp. 1-12.
Alexander et al., RFC 2132, Internet Engineering Task Force, 1997, pp. 1-34.
International Search Report dated Apr. 28, 2015 in connection with International Patent Application No. PCT/US2015/011937, 5 pages.
Written Opinion of International Searching Authority dated Apr. 28, 2015 in connection with International Patent Application No. PCT/US2015/011937, 6 pages.
11 Real-Time Data Hosting . . . 11, 2000-2009, 1 page, available at www.industrialevolution.com/ms_services_host.html.
Notification of Transmittal of the International Search Report and the Written Opinion of the International Searching Authority, or the Declaration dated Oct. 29, 2010 in connection with International Patent Application No. PCT/US2010/028208.
Notification of Transmittal of the International Search Report and the Written Opinion of the International Searching Authority, or the Declaration dated Oct. 29, 2010 in connection with International Patent Application No. PCT/US2010/028218.

(56) References Cited

OTHER PUBLICATIONS

Notification of Transmittal of the International Search Report and the Written Opinion of the International Searching Authority, or the Declaration dated Oct. 29, 2010 in connection with International Patent Application No. PCT/US2010/028210.
Aaron Skonnard, "Why Service Virtualization Matters", Microsoft Services, Mar. 2009, 4 pages.
Paul F. McLaughlin, et al., "Cloud Computing As a Basis for a Process Historian", U.S. Appl. No. 12/416,830, filed Apr. 1, 2009.
Paul F. McLaughlin, et al., "Cloud Computing for a Manufacturing Execution System", U.S. Appl. No. 12/416,790, filed Apr. 1, 2009.
Paul F. McLaughlin, et al., "Cloud Computing As a Basis for Equipment Health Monitoring Service", U.S. Appl. No. 12/416,848, filed Apr. 1, 2009.
Communication pursuant to Article 94(3) EPC dated Mar. 15, 2013 in connection with European Patent Application No. 10 764 816. 4-1954.
Supplementary European Search Report dated Mar. 4, 2013 in connection with European Patent Application No. EP 10 76 4816-1954.
Zheng Wang, et al., "Prefetching in World Wide Web", IEEE Global Telecommunications Conference, Nov. 1996, p. 28-32.
Supplementary European Search Report dated Nov. 19, 2012 in connection with European Patent Application No. EP 10 76 4813. 1-2206.
Final Office Action dated Feb. 10, 2012 in connection with U.S. Appl. No. 12/416,830.
Kevin P. Staggs, et al., "Cloud Computing for an Industrial Automation and Manufacturing System", U.S. Appl. No. 12/416,859, filed Apr. 1, 2009.
Enrique Castro-Leno, et al., "IT and business Integration through the Convergence of Virtualization, SOA and Distributed Computing," IEEE International Conference on Business Engineering, 2008, pp. 615-620.
"IPsec," Jun. 15, 2014, 10 pages, available at www.wikipedia.org.
Bootstrap Protocol, Mar. 2014, 3 pages available at www.wikipedia.org.
Harshal S. Haridas et al., "Cloud-Based Control Platform With Connectivity to Remote Embedded Devices in Distributed Control System", U.S. Appl. No. 15/251,815, filed Aug. 30, 2016.
Shreehari Sreenivasamurthy, et al., "System and Method for Protecting Information for Enhanced Life Cycle Support and Disaster Recovery of Industrial Process Control and Automation Systems," U.S. Appl. No. 15/346,903, filed Nov. 9, 2016.

\* cited by examiner

SECURE APPROACH FOR PROVIDING COMBINED ENVIRONMENT FOR OWNERS/OPERATORS AND MULTIPLE THIRD PARTIES TO COOPERATIVELY ENGINEER, OPERATE, AND MAINTAIN AN INDUSTRIAL PROCESS CONTROL AND AUTOMATION SYSTEM

CROSS-REFERENCE TO RELATED APPLICATION AND PRIORITY CLAIM

This application claims priority under 35 U.S.C. § 119(e) to U.S. Provisional Patent Application No. 62/345,661 filed on Jun. 3, 2016, which is hereby incorporated by reference in its entirety.

TECHNICAL FIELD

This disclosure relates generally to industrial process control and automation. More specifically, this disclosure relates to a secure approach for providing a combined environment for owners/operators and multiple third parties to cooperatively engineer, operate, and maintain an industrial process control and automation system.

BACKGROUND

Computer-based industrial process control and automation systems often incorporate a broad range of physical process equipment, which can often be packaged as modular "skids." This is true in systems such as Supervisory Control and Data Acquisition (SCADA) systems, Human Machine Interface (HMI) systems, and Distributed Control System (DCS) systems. An integrator or original equipment manufacturer (OEM) can construct a skid having key physical equipment, such as associated process controllers, instruments, and actuators.

In some cases, integrators and OEMs offer services beyond skid construction, such as process controller configuration. However, end users or owners of control and automation systems or their agents often need to map configurations of skids in terms of key variables to be monitored/controlled to named tags referenced in control and automation systems. Similarly, monitoring and control graphics of user interfaces for control and automation systems, along with other supervisory control functions (such as alarming, reporting, and historical data logging), often need to be built and mapped to these tags so that process operators can use these functions to effectively manage industrial processes.

SUMMARY

This disclosure provides a secure approach for providing a combined environment for owners/operators and multiple third parties to cooperatively engineer, operate, and maintain an industrial process control and automation system.

In a first embodiment, a method includes creating, in a secure platform, multiple securely-partitioned system sandboxes under control of at least one user associated with an industrial process control and automation system. Different system sandboxes are associated with different third parties who are not owners or operators of the industrial process control and automation system. The method also includes receiving content from the third parties in the system sandboxes. The method further includes receiving from the at least one user a selective activation of at least some of the content in the system sandboxes in order to place the at least some of the content into use by the industrial process control and automation system.

In a second embodiment, an apparatus includes at least one processing device configured to create, in a secure platform, multiple securely-partitioned system sandboxes under control of at least one user associated with an industrial process control and automation system. Different system sandboxes are associated with different third parties who are not owners or operators of the industrial process control and automation system. The at least one processing device is also configured to receive content from the third parties in the system sandboxes. The at least one processing device is further configured to receive from the at least one user a selective activation of at least some of the content in the system sandboxes in order to place the at least some of the content into use by the industrial process control and automation system.

In a third embodiment, a non-transitory computer readable medium contains computer readable program code that when executed causes at least one processing device to create, in a secure platform, multiple securely-partitioned system sandboxes under control of at least one user associated with an industrial process control and automation system. Different system sandboxes are associated with different third parties who are not owners or operators of the industrial process control and automation system. The medium also contains computer readable program code that when executed causes the at least one processing device to receive content from the third parties in the system sandboxes. The medium further contains computer readable program code that when executed causes the at least one processing device to receive from the at least one user a selective activation of at least some of the content in the system sandboxes in order to place the at least some of the content into use by the industrial process control and automation system.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
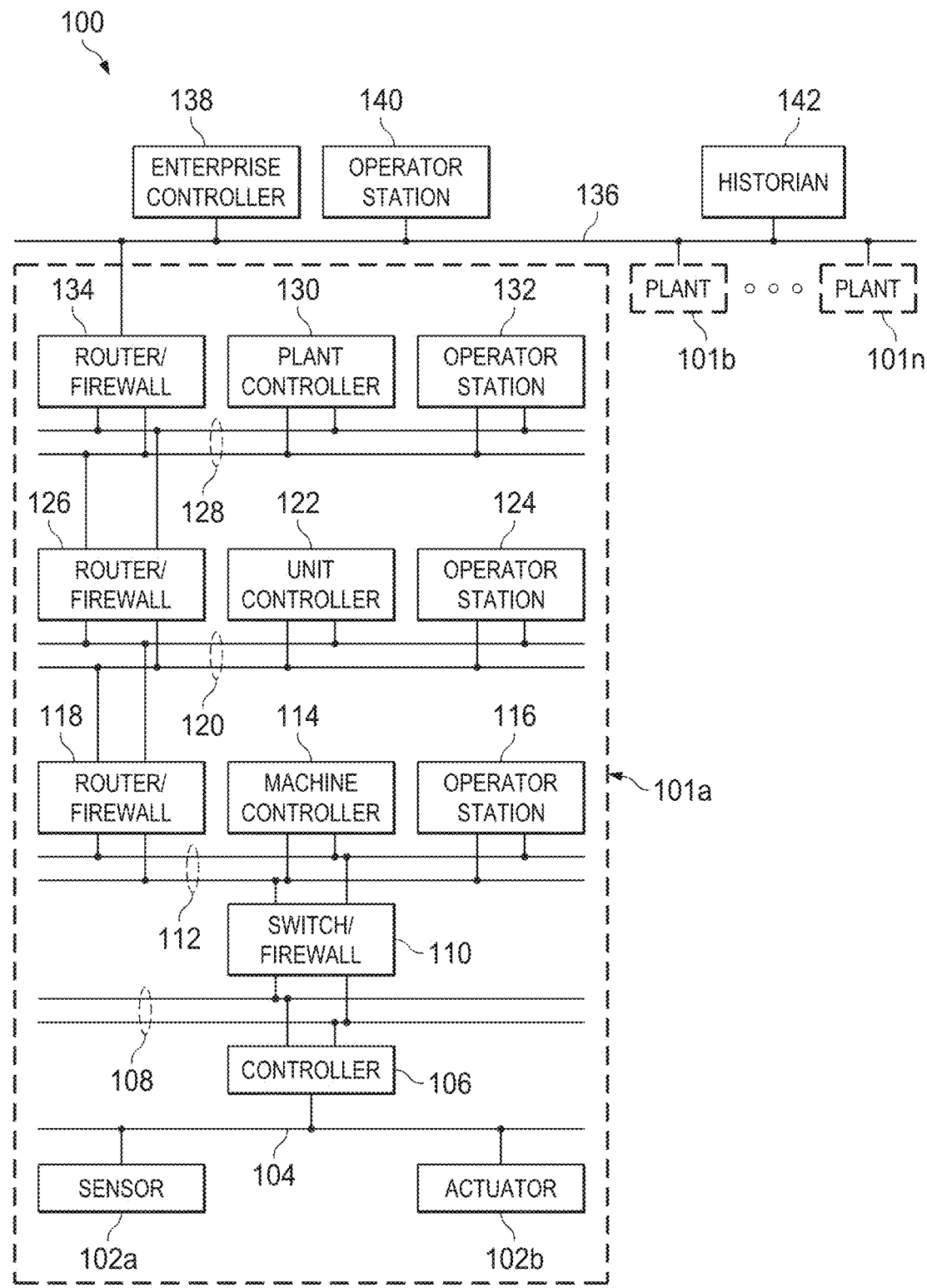
FIG. 1 illustrates an example industrial process control and automation system according to this disclosure.

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As described above, integrators and original equipment manufacturers (OEMs) can offer services related to equipment "skids," such as process controller configuration. However, this can require significant interactions between end users or owners of an industrial process control and automation system or their agents and the integrators and OEMs. While this could be achieved using sufficient manual interactions and sharing a range of documents, end users or owners seek the ability to streamline and support this interaction naturally, especially in the context of these systems being continually expanded. For instance, industrial processes can be expanded and changed to incorporate more equipment over time. As a result, the scenario of incorporating new physical equipment, programming control algorithms, and mapping this control to appropriate system graphics, reports, alarms, and history collections in order to achieve a desired overall function can continue indefinitely throughout the life of a control and automation system (possibly over multiple decades).

End users and owners with limited resources may also seek to extend the services that integrators and OEMs offer to the end users and owners as a standard capability. However, an end user or owner typically wants this to occur in a fashion that is both cyber-secure and under full control of the end user or owner with respect to allowed activities and access control for each user of a system.

An end user or owner may further require an integrator or OEM to be involved in checking out integration of new equipment with an overall system, performing simulated testing before equipment or skid shipment to a site, and supporting commissioning and troubleshooting on an ongoing basis using the unique expertise of that integrator or OEM. The lack of a standard mechanism for integrators and OEMs to provision these services makes them less economical or impractical in many cases due to complexity.

As end users and owners seek to reduce their costs, they may also look to standardize equipment and its configuration wherever possible. This can help to normalize operation of the equipment and simplify service functions on that equipment, such as in environments with constrained resources and skills. A wide range of integrators and OEMs may be involved in supplying equipment, so standardization is a challenge for end users and owners with respect to control system integration.

In addition, physical distance between integrators or OEMs and end user or owner operation centers and other roles can be very significant, such as hundreds or thousands of kilometers. In these types of situations, some form of remote service provisioning may be required as a matter of practicality.

This disclosure provides a secure (and possibly cloud-based) environment for control system operations and provides standard secure mechanisms for OEMs, integrators, end users, owners, and others to connect, collaborate, and provide or receive services associated with industrial process control and automation systems. Moreover, these actions can occur under the control of the end users or owners.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

One or more networks 104 are coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" includes one or more controllers 106, which are coupled to the network 104. Among other things, each controller 106 may use the measurements from one or more sensors 102a to control the operation of one or more actuators 102b. Each controller 106 includes any suitable structure for controlling one or more aspects of a process system. As a particular example, each controller 106 could represent a computing device running a real-time operating system.

Redundant networks 108 are coupled to the controllers 106. The networks 108 facilitate interaction with the controllers 106, such as by transporting data to and from the controllers 106. The networks 108 could represent any suitable redundant networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system. Other example types of operator stations 124 could include mobile devices, such as smartphones or tablet computers.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101*a* is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

A historian 142 is also coupled to the network 136 in this example. The historian 142 could represent a component that stores various information about the system 100. The historian 142 could, for example, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100.

Some of the operator stations described above may be situated remotely from other components of the control and automation system 100. For example, some of the operator stations could reside within an OEM or system integrator's office. In those cases, network infrastructure (such as that of a telecom operator or other entity) can be used to couple the operator stations to the control and automation system 100.

Various portions of the industrial process control and automation system 100 could be obtained from integrators or OEMs as skids. Installation of the skids could be done by personnel of the control and automation system 100, by the integrators or OEMs, or by others. As described below, a secure collaboration platform can be used by personnel to facilitate installation, servicing, or other functions related to the industrial equipment.

Although FIG. 1 illustrates one example of an industrial process control and automation system 100, various changes may be made to FIG. 1. For example, industrial control and automation systems come in a wide variety of configurations, such as when redundant networks are not used at some or all levels or not all levels of the Purdue model are implemented in a system. The system 100 shown in FIG. 1 is meant to illustrate one example operational environment in which secure collaboration between personnel may be used or supported. However, FIG. 1 does not limit this disclosure to any particular configuration or operational environment.

Figure 2:
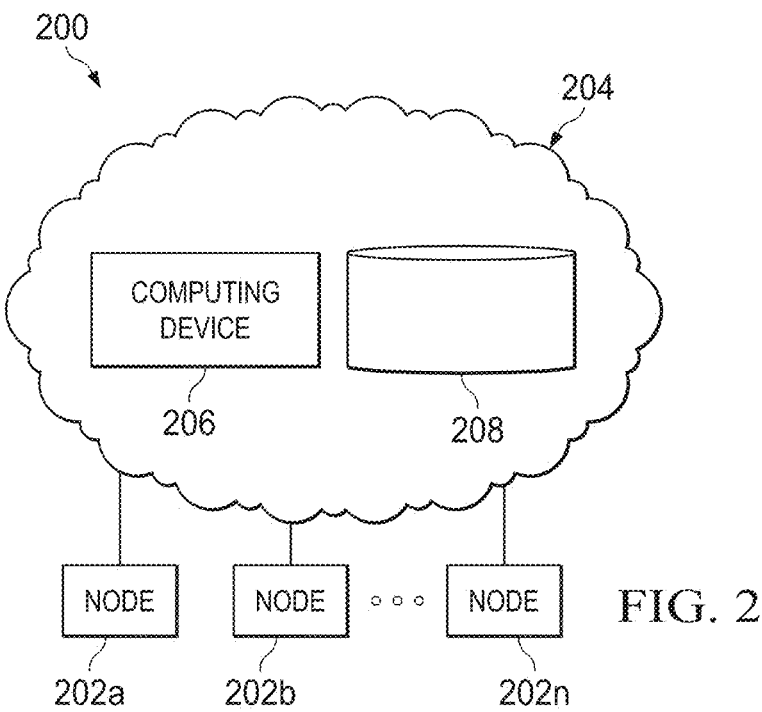
FIGS. 2 through 4 illustrate an example secure approach for providing a combined environment for owners/operators and multiple third parties to cooperatively engineer, operate, and maintain an industrial process control and automation system according to this disclosure.
Figure 3:
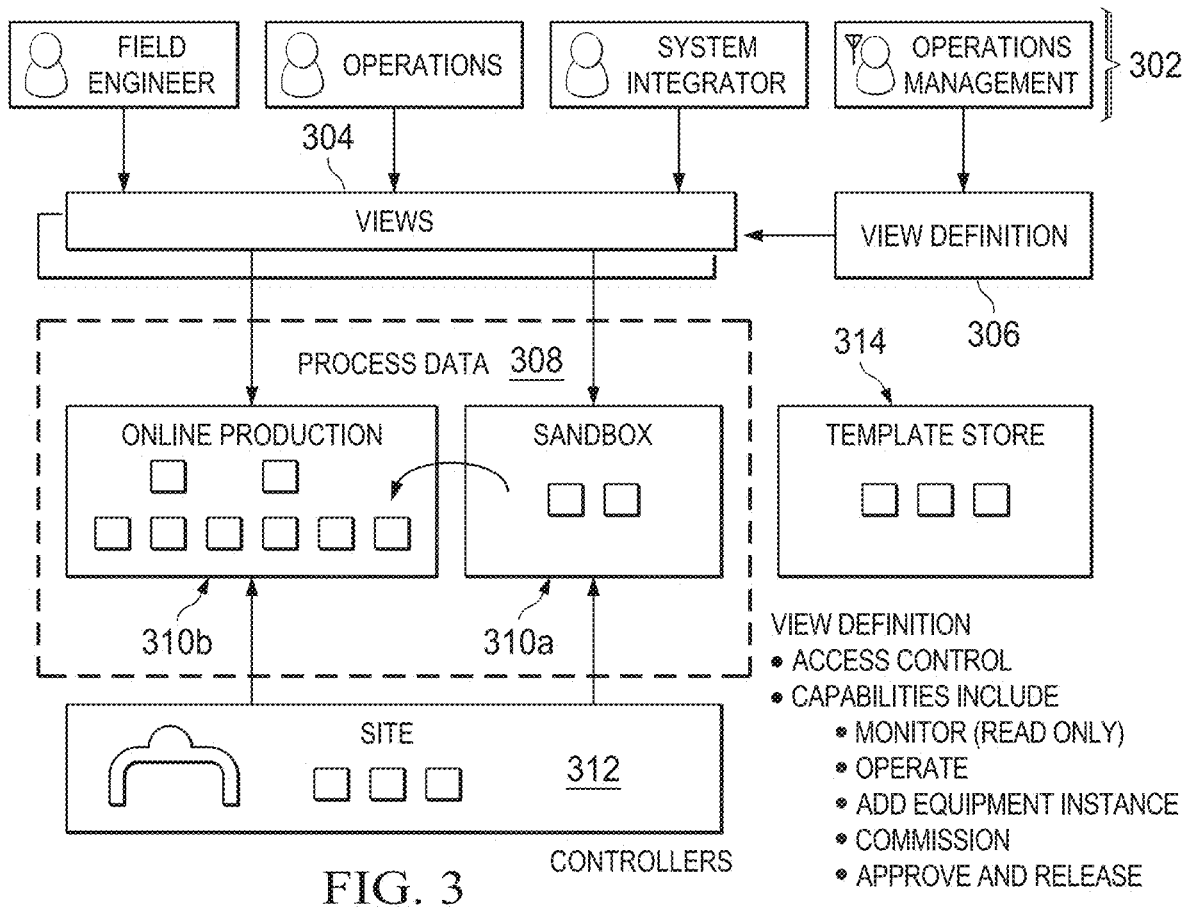
Figure 4:
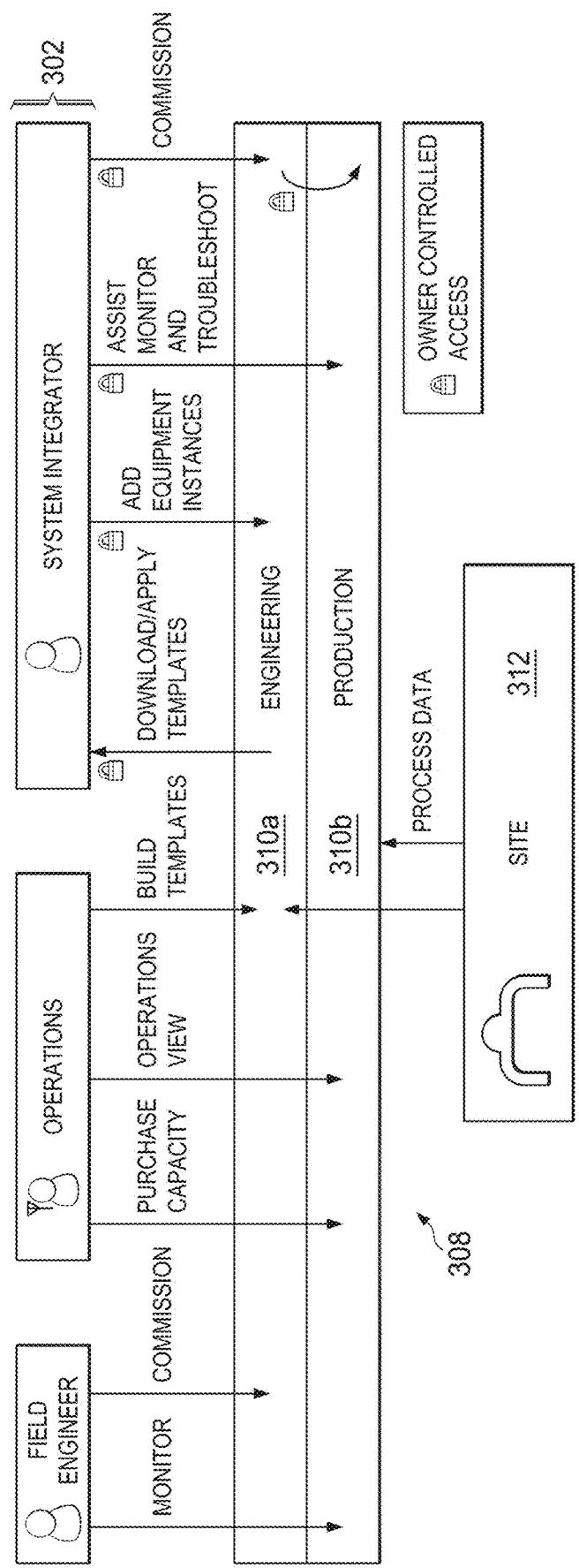

FIGS. 2 through 4 illustrate an example secure approach for providing a combined environment for owners/operators and multiple third parties to cooperatively engineer, operate, and maintain an industrial process control and automation system according to this disclosure. For ease of explanation, the secure approach illustrated in FIGS. 2 through 4 may be described with respect to the industrial process control and automation system 100 of FIG. 1. However, the secure approach illustrated in FIGS. 2 through 4 may be used with any other suitable industrial process control and automation system.

As shown in FIG. 2, a system 200 supports secure collaboration between various personnel associated with industrial equipment used at one or more locations. In this example, the system 200 includes a number of computing nodes 202*a*-202*n*. The computing nodes 202*a*-202*n* denote any suitable computing or communication devices that can be used by personnel. The computing nodes 202*a*-202*n* could, for instance, denote desktop computers, laptop computers, tablet computers, or mobile smartphones. The computing nodes 202*a*-202*n* could be used by various personnel, such as different personnel working for an end user or owner of a control and automation system and different personnel working for an integrator or OEM. Some of the computing nodes 202*a*-202*n* could denote operator stations or other components in the system 100 of FIG. 1.

The computing nodes 202*a*-202*n* are coupled directly or indirectly to a secure platform 204, which in this example is cloud-based and includes one or more servers or other computing devices 206 and one or more data storage devices 208. The computing device(s) 206 can execute applications or other logic that allows personnel using the computing nodes 202*a*-202*n* to collaborate and exchange information. The data storage device(s) 208 can store this information or other information related to one or more control and automation systems. In computing clouds, the specific device or devices executing logic and storing data can change over time, such as when different servers or other computing devices 206 are selected at different times for executing applications based on load balancing or other factors.

As described in more detail below, the computing devices 206 and the data storage devices 208 provide a secure environment for owners/operators and multiple third parties to cooperatively engineer, operate, and maintain an industrial process control and automation system, such as the system 100. The secure environment allows different types of users to access and share information related to an industrial process control and automation system. Among other things, the users are able to cooperatively design or engineer features of the industrial process control and automation system, operate equipment of the industrial process control and automation system, and maintain equipment of the industrial process control and automation system. Moreover, owners and operators of the industrial process control and automation system have the ability to control how other users (such as users associated with integrators and OEMs) can view or modify data. This approach allows owners and operators of the industrial process control and automation system to collaborate securely with other personnel to facilitate installation, servicing, or other functions related to industrial equipment in the industrial process control and automation system.

FIG. 3 illustrates features of the secure platform 204 used to support collaboration, and FIG. 4 illustrates one example use of the secure platform 204. As shown in FIG. 3, the secure platform 204 is associated with various types of user roles 302. Personnel having the various user roles 302 can use the computing nodes 202*a*-202*n* to access the secure platform 204 in order to collaborate with one another and make changes to an industrial process control and automation system. The different user roles 302 are associated with different types of personnel, so the different user roles 302 can be associated with different actions or permissions in the secure platform 204.

In this example, the user roles 302 include field engineers, operations personnel, and operations management personnel associated with an industrial process control and automation system. Field engineers may denote personnel responsible for configuring and maintaining field devices or other equipment in an industrial facility. Operations personnel may denote personnel responsible for overseeing larger or more complex areas of an industrial facility. Operations management personnel may denote personnel responsible for controlling access to the secure platform 204. The user roles 302 also include system integrators associated with an integrator or OEM. System integrators may denote personnel responsible for assisting in the installation or configuration of equipment in an industrial facility. Of course, other or additional user roles could also be supported by the secure platform 204.

The secure platform 204 supports the use of various views 304, which are controlled using a view definition function 306. A view 304 defines the access level and capabilities that a particular user role 302 has to assets in a control and automation system. For example, a system integrator may have "commission and release" capabilities to a specific asset in one location but no access to assets in other locations. Different views 304 allow the secure platform 204 to control access by different user roles 304 to a single model of a control or automation solution.

The view definition function 306 allows specified users to create, modify, or delete views 304. For instance, the view definition function 306 could support a graphical user interface that allows operations management personnel to create new views 304, review or modify existing views 304, and delete existing views 304. In some instances, the view definition function 306 could be accessible only to personnel associated with an industrial process control and automation system. This allows the owners or operators of an industrial process control and automation system to control which data associated with the control and automation system is made available to outside third parties and to control and modify that access over time.

At least one automation model 308 defines a set of equipment being monitored and controlled by users. An automation model 308 can include any suitable data related to a set of equipment, such as configuration and runtime properties, alarm and event definitions, and associated visualizations (like trend, schematic, and tabular diagrams). The automation model 308 can be generated in any suitable manner, such as with an automated tool that collects information from other components in a control and automation system and that generates the model 308 based on that information. The automation model 308 could also be generated or modified manually.

Equipment identified by an automation model 308 can be associated with a sandbox area 310a or with an online production area 310b. The sandbox area 310a generally denotes an area associated with equipment that is offline or not being used to actively control an industrial process. The online production area 310b denotes an area associated with equipment that is online and actually operating to actively control an industrial process. Equipment can be moved from the sandbox area 310a to the online production area 310b or vice versa, such as upon appropriate user approval. Also, multiple sandbox areas 310a and online production areas 310b could be associated with a single control and automation system. This may allow, for example, different third parties to access their own sandbox and production areas 310a-310b without having the ability to access other third parties' data areas.

Role capabilities can be different for the sandbox area 310a and the online production area 310b. For example, certain users may only be able to access information for equipment in the sandbox area 310a and not for equipment in the online production area 310b. This facilitates user workflows for building, commissioning, and operating at an appropriately granular level of process equipment. Equipment and associated entities can be easily moved from the sandbox area 310a to the online production area 310b and removed from the online production area 310b.

Runtime values in an automation model 308 can read from or written to process-connected controllers 312, such as by using or as part of a SCADA, HMI, or DCS system. Runtime values can be defined and examined in the sandbox area 310a, and runtime values can be read from or written to the controllers 312 using the online production area 310b.

In addition, the secure platform 204 supports the use of various templates 314. Each template 314 defines one or more structures, one or more properties, one or more relationships, one or more control strategies, and/or one or more visualizations (referred to generally as configurations) to allow automation model elements (equipment) to be easily configured. The templates 314 can be downloaded by various third parties (such as system integrators) and used to perform various functions, such as defining configuration and runtime properties for industrial equipment, defining alarm and event conditions for the industrial equipment, and creating visualizations (like trend, schematic, and tabular diagrams) for the industrial equipment. The templates 314 aid in the standardization of visualizations and interactions across equipment built by different system integrators.

Specific examples of the types of access and collaboration that could occur between users are shown in FIG. 4. As shown in FIG. 4, personnel associated with an industrial process control and automation system (such as field engineers, operations personnel, and operations management personnel) can engage in various activities via the secure platform 204. This includes commissioning new equipment in the sandbox area 310a and monitoring operational equipment in the online production area 310b. This also includes defining the views 304 and building the templates 314. This further includes purchasing capacity in the secure platform 204.

System integrators or other third parties can also engage in various activities via the secure platform 204. This includes downloading the templates 314 into the third parties' systems and using the templates 314 to help improve standardization of visualizations and interactions across equipment in the control and automation system. This also includes adding instances of new equipment in the sandbox area 310a, such as for equipment that is being installed or replaced in a control and automation system. This further includes the ability to commission equipment in the sandbox area 310a and to transition that equipment into active equipment in the online production area 310b. In addition, this includes the ability to monitor data and troubleshoot problems associated with active equipment in the control and automation system.

Note that all of the third-party functions are identified in FIG. 4 as being subject to access controls. As noted above, the owners or operators of an industrial process control and automation system can have control over the information that is accessible by third parties, such as via definitions of the views 304. Thus, third-party system integrators or other third parties can obtain access to the information in the secure platform 204 only as allowed by the owners or operators of an industrial process control and automation system. Moreover, different third parties can have different access rights to the information in the secure platform 204 as needed or desired, and the access rights provided to a single third party could vary over time as needed or desired.

In one aspect of operation, personnel associated with integrators or OEMs can download end user approved templates 314 to drive standardization of equipment integration for a control and automation system. Flexible templating allows similar (but not necessarily identical) equipment variations to map directly into a control and automation system based on auto-generated displays and database mappings. Engineering configurations can be created by end users, owners, integrators, or OEMs in a "safe area" within the secure environment (the sandbox area 310a), and the environment facilitates collaborative checkout of any defined configuration. Additionally, the end users or owners have full control to approve and release new configurations into the online production area 310b when appropriate.

This approach supports collaborative access by multiple third parties to securely-partitioned system sandboxes (such as one or more per third party) under the control of one or more end users (such as an owner or operator of the system 100). The end user has an ability to jointly review information with the third party and to selectively activate third party engineered content from one or more sandboxes to an operational status without requiring file transfers or data re-entry. The end user also has an ability to require that third parties implement configurations via nominated templates. Third party access can be controlled in multiple dimensions, such as capabilities (like monitoring, configuring, or commissioning), equipment groupings, and data classifications (like process or maintenance). These and other features support collaboration that is independent of personnel and physical automation equipment location and can include personnel in third party engineering offices, in end user offices, or in the field.

This environment provides the ability for end users and owners to allow secure access for integrators and OEMs to help commission, monitor, and troubleshoot equipment being supplied to the end users and owners as ongoing services. The overall system therefore acknowledges and supports the integrators and OEMs as third party providers within the system environment and provides built-in mechanisms to allow the appropriate interactions with user roles in a highly secure manner to protect system integrity at all times. It inherently provides for granular engineering, checkout, monitoring, and troubleshooting of equipment in a securely-managed and collaborative environment to greatly improve efficiency in the initial implementation and ongoing (potentially continuous) expansion and update of facilities.

Conventional approaches separate development systems of integrators and OEMs from deployed end user/owner systems. Engineering improvements involving an integrator or OEM assisting an end user or owner usually involve configuring one system, exporting and transmitting the configuration, and importing and checking out the configuration on the end user/owner system. Access to the end user/owner system would ordinarily have to be arranged as a custom communications arrangement for secure access through information technology (IT) infrastructures and networks. Additionally, any review and approval process would be managed as a manual workflow by the end user or owner without any obvious partitioning between parties. Similarly, any conventional monitoring services would have to be arranged in an ad hoc manner, and an end user or owner would normally have to manually configure any scope of access mapping for each integrator or OEM to equipment to be monitored or analyzed. Existing offerings do not provide end users or owners with the same level of access and configuration flexibility as the end users or owners have with on-premises systems. Rather, existing offerings usually have fixed configurations for all users, and configuration changes need to be requested from a hosted system provider. The approaches described in this disclosure help to reduce or avoid these problems. In some embodiments, the approaches described in this disclosure provide an ability to customize all key elements of an operational system (including graphics, reports, data points or tags, alarms, and history) in a manner similar to an on-premises experience.

Although FIGS. 2 through 4 illustrate one example of a secure approach for providing a combined environment for owners/operators and multiple third parties to cooperatively engineer, operate, and maintain an industrial process control and automation system, various changes may be made to FIGS. 2 through 4. For example, while described here as being cloud-based, the secure platform could be implemented in other ways, such as when hosted by an end user/owner system or on a remote server system that is not cloud-based.

Figure 5:
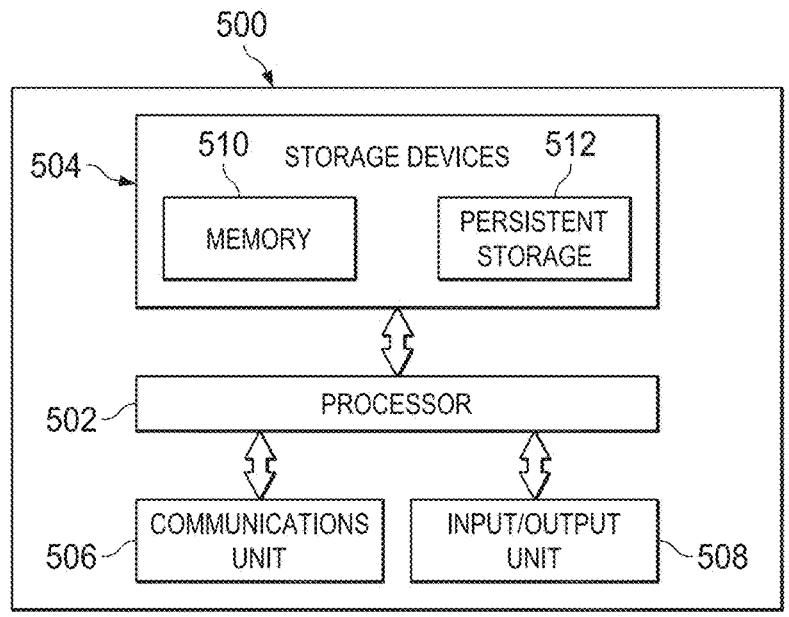
FIG. 5 illustrates an example device supporting a secure approach for providing a combined environment for owners/operators and multiple third parties to cooperatively engineer, operate, and maintain an industrial process control and automation system according to this disclosure.

FIG. 5 illustrates an example device 500 supporting a secure approach for providing a combined environment for owners/operators and multiple third parties to cooperatively engineer, operate, and maintain an industrial process control and automation system according to this disclosure. The device 500 could, for example, denote various computing devices in the system 100 of FIG. 1 or in the system 200 of FIG. 2.

As shown in FIG. 5, the device 500 includes at least one processor 502, at least one storage device 504, at least one communications unit 506, and at least one input/output (I/O) unit 508. Each processor 502 can execute instructions, such as those that may be loaded into a memory 510. Each processor 502 denotes any suitable processing device, such as one or more microprocessors, microcontrollers, digital signal processors, application specific integrated circuits (ASICs), field programmable gate arrays (FPGAs), or discrete circuitry.

The memory 510 and a persistent storage 512 are examples of storage devices 504, which represent any structure(s) capable of storing and facilitating retrieval of information (such as data, program code, and/or other suitable information on a temporary or permanent basis). The memory 510 may represent a random access memory or any other suitable volatile or non-volatile storage device(s). The persistent storage 512 may contain one or more components or devices supporting longer-term storage of data, such as a read only memory, hard drive, Flash memory, or optical disc.

The communications unit 506 supports communications with other systems or devices. For example, the communications unit 506 could include a network interface card or a wireless transceiver facilitating communications over a wired or wireless network (such as the network 106b). The communications unit 506 may support communications through any suitable physical or wireless communication link(s).

The I/O unit 508 allows for input and output of data. For example, the I/O unit 508 may provide a connection for user input through a keyboard, mouse, keypad, touchscreen, or other suitable input device. The I/O unit 508 may also send output to a display, printer, or other suitable output device.

Although FIG. 5 illustrates one example of a device 500 supporting a secure approach for providing a combined environment for owners/operators and multiple third parties to cooperatively engineer, operate, and maintain an industrial process control and automation system, various changes may be made to FIG. 5. For example, various components in FIG. 5 could be combined, further subdivided, or omitted and additional components could be added according to particular needs. Also, computing devices can come in a wide variety of configurations, and FIG. 5 does not limit this disclosure to any particular configuration of computing device.

Figure 6:
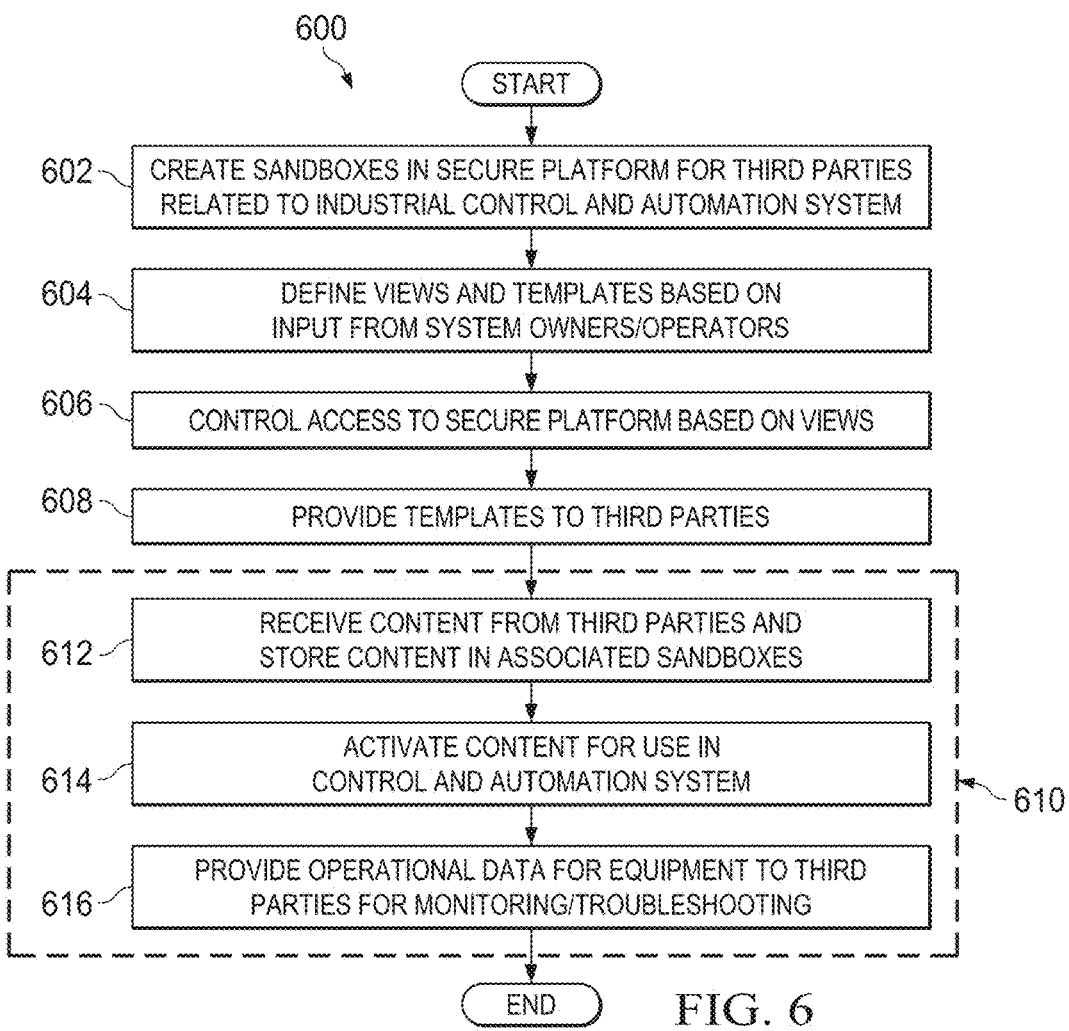
FIG. 6 illustrates an example method for providing a combined environment for owners/operators and multiple third parties to cooperatively engineer, operate, and maintain an industrial process control and automation system using a secure approach according to this disclosure.

FIG. 6 illustrates an example method 600 for providing a combined environment for owners/operators and multiple third parties to cooperatively engineer, operate, and maintain an industrial process control and automation system using a secure approach according to this disclosure. For ease of explanation, the method 600 is described as being performed using the system 200 of FIG. 2 on behalf of owners/operators of the industrial process control and automation system 100 of FIG. 1. However, the method 600 could be used in any other suitable system and for any other suitable industrial process control and automation system.

As shown in FIG. 6, multiple sandboxes in a secure platform are created for multiple third parties associated with an industrial process control and automation system at step 602. This could include, for example, one or more users associated with the industrial process control and automation system 100 accessing the secure platform 204 and initiating creation of multiple sandbox areas 310a. Each sandbox area 310a could be associated with a different third party, such as a different integrators or OEMs. The industrial process control and automation system 100 could include equipment supplied, installed, or monitored by or otherwise associated with multiple (and possibly a large number) of integrators, OEMs, or other third parties. One, some, or all of these third parties could have their own sandbox areas 310a.

Views and templates are defined in the secure platform based on input from the owners/operators of the industrial process control and automation system at step 604. This could include, for example, the secure platform 204 receiving input defining multiple views 304 via the view definition function 306. Each view 304 can define (i) access rights that a user role 302 could have to data stored by the secure platform 204 and (ii) functions that could be invoked by the user role 302 in the secure platform 204. This could also include the secure platform 204 receiving data defining multiple templates 314 associated with equipment in the industrial process control and automation system 100. The templates 314 can define the structures, properties, relationships, control strategies, or visualizations associated with the equipment. Depending on the owners/operators, one possible use of the templates 314 is to help define common configurations to be used by multiple third parties across various equipment in the control and automation system 100.

The third parties can access the secure platform, and the secure platform uses the defined views to control the access to the secure platform at step 606. This could include, for example, the secure platform 204 detecting access to a specific sandbox 310a of the secure platform 204 by a specified user. This could also include the secure platform 204 identifying the user role 302 associated with the user and identifying the view 304 associated with that user role 302. The identified view 304 can be used to control which data can be accessed by the user and which functions can be invoked by the user.

The secure platform can also allow the download of the defined templates to the third parties at step 608. This could include, for example, the secure platform 204 allowing an authorized user to download one or more templates 314 to a third party's computer system. Once downloaded, the third party can use the templates 314 in any suitable manner. For instance, the third party could generate configurations for equipment to be installed in the industrial process control and automation system 100 in line with the template 314 for that equipment. If the same template 314 is used by multiple third parties for the same type of equipment, this can help to standardize the configurations for that equipment across multiple integrators or OEMs.

The secure platform allows the various entities to exchange data and collaborate via the secure platform generally at step 610. This could include, for example, the secure platform 204 using the views 304 to ensure that third-party users are able to access only allowed data and invoke allowed functions of the secure platform 204. Data uploaded to the secure platform 204 by a third party can be placed into that third party's sandbox area 310a. The owners/operators of the industrial process control and automation system 100 can review the data, make or request changes, and perform other collaborative actions.

As part of this collaboration, the secure platform can receive content from the third parties and store the content in the associated sandboxes 310a at step 612. Also, content in the sandboxes can be selectively activated for use in the industrial process control and automation system at step 614. This may include, for example, the secure platform 204 receiving equipment configurations from the third parties and storing the equipment configurations in the sandbox areas 310a. This may also include the owners/operators of the industrial process control and automation system 100 or their agents approving of the equipment configurations and moving the equipment configurations from the sandbox areas 310a to one or more online production areas 310b. The content received from the third parties could comply with the templates 314 previously provided to the third parties.

As another part of this collaboration, operational data associated with online equipment in the industrial process control and automation system can be provided to one or more of the third parties at step 616. This could include, for example, run-time data, historical data, or other data associated with equipment in the industrial process control and automation system 100 being provided to the third parties via one or more online production areas 310b. This data could be used by the third parties to provide remote monitoring, troubleshooting, or other services to the owners/operators of the industrial process control and automation system 100.

Note that this represents two examples of the types of collaborations that could occur between personnel associated with an industrial process control and automation system 100 and personnel associated with one or more third parties. Any other or additional collaborations could also occur involving these personnel.

In this way, third parties are able to engage with the owners/operators of the industrial process control and automation system 100 more effectively and efficiently. The services provided by integrators and OEMs can be expanded in a manner that is cyber-secure and under the full control of the owners/operators, and the owners/operators can standardize equipment and its configuration more easily. The integrators and OEMs can more easily check out the integration of new equipment with an overall system, perform simulated testing before equipment is shipped to a site, and support commissioning and troubleshooting on an ongoing basis. This can all occur regardless of the physical distance between the integrators or OEMs and a site. It can also occur over a prolonged period of time to support functions like incorporating new physical equipment, programming control algorithms, and mapping control to appropriate system graphics, reports, alarms, and history collections (such as throughout the life of the control and automation system 100).

Although FIG. 6 illustrates one example of a method 600 for providing a combined environment for owners/operators and multiple third parties to cooperatively engineer, operate, and maintain an industrial process control and automation system using a secure approach, various changes may be made to FIG. 6. For example, while shown as a series of steps, various steps in FIG. 6 could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method that provides a secure approach for providing a combined environment that allows a plurality of users to cooperatively operate and maintain an industrial process control and automation system comprising:
   creating, in a secure platform, multiple securely-partitioned system sandboxes under control of at least one user associated with the industrial process control and automation system, different system sandboxes associated with different third parties who are not owners or operators of the industrial process control and automation system, wherein the secure platform includes a plurality of views defining an access level and capabilities of the third parties based on the location of a specific asset of the industrial process control and automation system but no access to the other assets in other locations;
   receiving templates from the at least one user, each template defining one or more equipment configurations associated with the industrial process control and automation system; and
   providing one or more templates to each of the third parties, wherein the content received from each of the third parties is based on the one or more templates provided to the third party, and whereby the content received from the multiple third parties for the same type of equipment is used to standardize the one or more equipment configurations associated with the process control and automaton system;
   receiving content from the third parties and store content in the system sandboxes associated with the third parties, wherein storing of content is based on the access level and capabilities defined in the views; and
   receiving from the at least one user a selective activation of at least some of the content in the system sandboxes in order to place the at least some of the content into use by the industrial process control and automation system.

2. The method of claim 1, wherein:
   the at least some of the content placed into use by the industrial process control and automation system comprises equipment configurations for equipment associated with the industrial process control and automation system; and
   the equipment configurations comprise control strategies and visualizations for the equipment.

3. The method of claim 1, wherein the at least some of the content is placed into use by the industrial process control and automation system without requiring an additional file transfer involving the third parties and without requiring re-entry of the content.

4. The method of claim 1, wherein the secure platform supports collaboration between the owners or operators of the industrial process control and automation system and the third parties independent of personnel and physical automation equipment location.

5. The method of claim 1, further comprising:
receiving operational data based on operation of equipment associated with the industrial process control and automation system; and
providing the operational data to at least one of the third parties engaging in remote monitoring or troubleshooting for the equipment.

6. An apparatus that provides a secure approach for providing a combined environment that allows a plurality of users to cooperatively operate and maintain an industrial process control and automation system comprising:
at least one processing device configured to:
create, in a secure platform, multiple securely-partitioned system sandboxes under control of at least one user associated with the industrial process control and automation system, different system sandboxes associated with different third parties who are not owners or operators of the industrial process control and automation system, wherein the secure platform includes a plurality of views defining an access level and capabilities of the third parties based on the location of a specific asset of the industrial process control and automation system but no access to the other assets in other locations;
receive templates from the at least one user, each template defining one or more equipment configurations associated with the industrial process control and automation system; and
provide one or more templates to each of the third parties, wherein the content received from each of the third parties is based on the one or more templates provided to the third party, and whereby the content received from the multiple third parties for the same type of equipment is used to standardize the one or more equipment configurations associated with the process control and automaton system;
receive content from the third parties and store content in the system sandboxes associated with the third parties, wherein storing of content is based on the access level and capabilities defined in the views; and
receive from the at least one user a selective activation of at least some of the content in the system sandboxes in order to place the at least some of the content into use by the industrial process control and automation system.

7. The apparatus of claim 6, wherein:
the at least some of the content placed into use by the industrial process control and automation system comprises equipment configurations for equipment associated with the industrial process control and automation system; and
the equipment configurations comprise control strategies and visualizations for the equipment.

8. The apparatus of claim 6, wherein the at least one processing device is configured to place the at least some of the content into use by the industrial process control and automation system without requiring an additional file transfer involving the third parties and without requiring re-entry of the content.

9. The apparatus of claim 6, wherein the at least one processing device is further configured to support collaboration between the owners or operators of the industrial process control and automation system and the third parties independent of personnel and physical automation equipment location.

10. The apparatus of claim 6, wherein the at least one processing device is further configured to:
receive operational data based on operation of equipment associated with the industrial process control and automation system; and
provide the operational data to at least one of the third parties engaging in remote monitoring or troubleshooting for the equipment.

11. A non-transitory computer readable medium containing computer readable program code that when executed causes at least one processing device to provide a secure approach for providing a combined environment that allows a plurality of users to cooperatively operate and maintain an industrial process control and automation system, to:
create, in a secure platform, multiple securely-partitioned system sandboxes under control of at least one user associated with the industrial process control and automation system, different system sandboxes associated with different third parties who are not owners or operators of the industrial process control and automation system, wherein the secure platform includes a plurality of views defining an access level and capabilities of the third parties based on the location of a specific asset of the industrial process control and automation system but no access to the other assets in other locations;
receive templates from the at least one user, each template defining one or more equipment configurations associated with the industrial process control and automation system; and
provide one or more templates to each of the third parties, wherein the content received from each of the third parties is based on the one or more templates provided to the third party, and whereby the content received from the multiple third parties for the same type of equipment is used to standardize the one or more equipment configurations associated with the process control and automaton system;
receive content from the third parties and store content in the system sandboxes associated with the third parties, wherein storing of content is based on the access level and capabilities defined in the views; and
receive from the at least one user a selective activation of at least some of the content in the system sandboxes in order to place the at least some of the content into use by the industrial process control and automation system.

12. The non-transitory computer readable medium of claim 11, wherein:
the at least some of the content placed into use by the industrial process control and automation system comprises equipment configurations for equipment associated with the industrial process control and automation system; and
the equipment configurations comprise control strategies and visualizations for the equipment.

13. The non-transitory computer readable medium of claim 12, further containing computer readable program code that when executed causes the at least one processing device to:
    in response to the selective activation, activate the at least some of the content to an operational status in order to configure the equipment using the equipment configurations.

14. The non-transitory computer readable medium of claim 11, further containing computer readable program code that when executed causes the at least one processing device to:
    support collaboration between the owners or operators of the industrial process control and automation system and the third parties independent of personnel and physical automation equipment location.

15. The non-transitory computer readable medium of claim 11, further containing computer readable program code that when executed causes the at least one processing device to:
    receive operational data based on operation of equipment associated with the industrial process control and automation system; and
    provide the operational data to at least one of the third parties engaging in remote monitoring or troubleshooting for the equipment.

\* \* \* \* \*